US012014666B2

(12) United States Patent
Cao et al.

(10) Patent No.: US 12,014,666 B2
(45) Date of Patent: Jun. 18, 2024

(54) PIXEL DRIVING CIRCUIT AND DISPLAY PANEL

(71) Applicant: WUHAN CHINA STAR OPTOELECTRONICS TECHNOLOGY CO., LTD., Wuhan (CN)

(72) Inventors: Haiming Cao, Wuhan (CN); Chao Tian, Wuhan (CN); Fei Ai, Wuhan (CN); Guanghui Liu, Wuhan (CN)

( * ) Notice: Subject to any disclaimer, the term of this patent is extended or adjusted under 35 U.S.C. 154(b) by 0 days.

(21) Appl. No.: 17/976,803

(22) Filed: Oct. 30, 2022

(65) Prior Publication Data

US 2024/0119883 A1 Apr. 11, 2024

(30) Foreign Application Priority Data

Oct. 11, 2022 (CN) ........................ 202211240703.2

(51) Int. Cl.

*G09G 3/32* (2016.01)
*G09G 3/20* (2006.01)
*G09G 3/3233* (2016.01)

(52) U.S. Cl.

CPC ............ *G09G 3/2014* (2013.01); *G09G 3/32* (2013.01); *G09G 2300/0842* (2013.01); *G09G 2310/0264* (2013.01); *G09G 2310/08* (2013.01); *G09G 2320/0242* (2013.01); *G09G 2320/0633* (2013.01)

(58) Field of Classification Search

CPC .................. G09G 3/2014; G09G 3/32; G09G 2300/0842; G09G 2310/0264; G09G 2310/08

See application file for complete search history.

(56) References Cited

U.S. PATENT DOCUMENTS

2011/0084993 A1* 4/2011 Kawabe .............. G09G 3/3258 345/691
2021/0407376 A1* 12/2021 Yue ..................... G09G 3/3233
2022/0114951 A1* 4/2022 Chang ................. G09G 3/2007

FOREIGN PATENT DOCUMENTS

CN WO 2015/184726 A1 * 12/2015 .......... G09G 3/3233
CN 105083336 A * 9/2022 .............. G09G 3/32
CN 115083336 A * 9/2022 .............. G09G 3/32

* cited by examiner

*Primary Examiner* — Lin Li

(57) ABSTRACT

A pixel driving circuit and a display panel are provided. The pixel driving circuit includes a data writing module, a data conversion module, and a current driving module. The data writing module is electrically connected to a first node and configured to transmit a data signal to the first node. The data conversion module is electrically connected to the first node, a second node, and a modulation signal source, and configured to generate a current driving control signal, and to output the current driving control signal to the second node. The current driving module is electrically connected to the second node, a light-emitting control wire, and a light-emitting device, and configured to control the light-emitting device to emit light. An effective pulse of the current driving control signal has different pulse widths in different gray-scale states.

14 Claims, 5 Drawing Sheets

PIXEL DRIVING CIRCUIT AND DISPLAY PANEL

CROSS-REFERENCE TO RELATED APPLICATION

This application is based on and claims priority to China Patent Application No. 202211240703.2, filed on Oct. 11, 2022, in the China National Intellectual Property Administration, the disclosure of which is incorporated by reference herein in its entirety.

TECHNICAL FIELD

The present disclosure relates to a field of display technology, and more particularly, to a pixel driving circuit and a display panel.

BACKGROUND

In current display panels, when gray scales of sub-pixels are presented by a pulse amplitude modulation driving method, the wavelength and gray scale of light emitted in response to an amplitude of driving current change at the same time. In this case, there is a problem that color reproducibility of an image is deteriorated (i.e., color deviation).

SUMMARY

An embodiment of the present disclosure provides a pixel driving circuit including a data writing module electrically connected to a first node and configured to transmit a data signal to the first node; a data conversion module electrically connected to the first node, a second node, and a modulation signal source, and configured to generate a current driving control signal, and to output the current driving control signal to the second node; and a current driving module electrically connected to the second node, a light-emitting control wire, and a light-emitting device, and configured to control the light-emitting device to emit light. An effective pulse of the current driving control signal has different pulse widths in different gray-scale states.

Alternatively, in some embodiments of the present disclosure, a modulation signal generated by the modulation signal source includes a triangular wave signal.

Alternatively, in some embodiments of the present disclosure, a voltage value of the modulation signal is less than a voltage value of the data signal during a first time period. The pulse width is equal to the first time period.

Alternatively, in some embodiments of the present disclosure, the current driving control signal has a plurality of first effective pulses in a high gray-scale state, the current driving control signal has a plurality of second effective pulses in a low gray-scale state, and the pulse width of each of the plurality of first effective pulses is greater than the pulse width of each of the plurality of second effective pulses, and an amplitude of each of the plurality of first effective pulses is equal to an amplitude of each of the plurality of second effective pulses.

Alternatively, in some embodiments of the present disclosure, the data conversion module includes: a current source unit electrically connected to a third node; a current mirror unit electrically connected to the third node, the first node, the modulation signal source, and a fourth node, and configured to generate a pulse width modulation signal, and to output the pulse width modulation signal to the fourth node; a signal correction unit electrically connected to the fourth node and the second node, and configured to generate the current driving control signal and to transmit the current driving control signal to the second node.

Alternatively, in some embodiments of the present disclosure, the current mirror cell includes a first transistor, a second transistor, a third transistor, and a fourth transistor.

A gate of the first transistor is electrically connected to the modulation signal source and a source and a drain of the first transistor are disposed between and electrically connected to the third node and the fourth node. A gate of the second transistor is electrically connected to the first node, and one of a source and a drain of the second transistor is electrically connected to the third node. A gate of the third transistor is electrically connected to the other of the source and the drain of the second transistor, and a source and a drain of the third transistor are disposed between and electrically connected to the other of the source and the drain of the second transistor and a first power supply terminal. A gate of the fourth transistor is electrically connected to the other of the source and the drain of the second transistor, and a source and a drain of the fourth transistor are disposed between and electrically connected to the fourth node and the first power supply terminal.

Alternatively, in some embodiments of the present disclosure, the current source unit includes a fifth transistor, a gate of the fifth transistor is electrically connected to a second power supply terminal, and a source and a drain of the fifth transistor are disposed between and electrically connected to the second power supply terminal and the third node.

The signal correction unit includes a sixth transistor and a seventh transistor, a gate of the sixth transistor and a gate of the seventh transistor are both electrically connected to the fourth node, a source and a drain of the sixth transistor are disposed between and electrically connected to a third power supply terminal and the second node, and a source and a drain of the seventh transistor are disposed between and electrically connected to a fourth power supply terminal and the second node.

A voltage value of a second power supply signal transmitted through the second power supply terminal is greater than a voltage value of a first power supply signal transmitted through the first power supply terminal, and a voltage value of a fourth power supply signal transmitted through the fourth power supply terminal is greater than a voltage value of a third power supply signal transmitted through the third power supply terminal.

Alternatively, in some embodiments of the present disclosure, the data writing module includes: an eighth transistor, wherein a gate of the eighth transistor is electrically connected to a scan wire, and a source and a drain of the eighth transistor are disposed between and electrically connected to the first node and a data wire; and a first capacitor disposed between and connected in series with the first node and a fifth power supply terminal.

Alternatively, in some embodiments of the present disclosure, the current driving module includes: a ninth transistor, wherein a gate of the ninth transistor is electrically connected to the second node, and one of a source and a drain of the ninth transistor is electrically connected to a sixth power supply terminal; and a tenth transistor, wherein a gate of the tenth transistor is electrically connected to the light-emitting control wire, and a source and a drain of the tenth transistor are disposed between and electrically connected to the other of the source and drain of the ninth transistor and an anode of the light-emitting device.

A cathode of the light-emitting device is electrically connected to a fifth power supply terminal, and a voltage value of a sixth power supply signal transmitted by the sixth power supply terminal is greater than a voltage value of a fifth power supply signal transmitted by the fifth power supply terminal.

Alternatively, in some embodiments of the present disclosure, the pixel driving circuit further includes a reset module, wherein the reset module includes an eleventh transistor, and wherein a gate of the eleventh transistor is electrically connected to a reset control wire, and a source and a drain of the eleventh transistor are disposed between and electrically connected to the first node and a fifth power supply terminal.

In an embodiment of the present disclosure, a display panel including a pixel driving circuit as described above may be further provided.

In an embodiment of the present disclosure, a display panel including a plurality of pixel driving circuits and a plurality of light-emitting devices may be further provided. The plurality of pixel driving circuits are electrically connected to the plurality of light-emitting devices, and at least one of the plurality of pixel driving circuits includes:

A first transistor, wherein a gate of the first transistor is electrically connected to a modulation signal source and a source and a drain of the first transistor are disposed between and electrically connected to a third node and a fourth node;

A second transistor, wherein a gate of the second transistor is electrically connected to a first node, and one of a source and a drain of the second transistor is electrically connected to a second power supply terminal via the third node;

A third transistor, wherein a gate of the third transistor is electrically connected to the other of the source and the drain of the second transistor, and a source and a drain of the third transistor are disposed between and electrically connected to the other of the source and the drain of the second transistor and a first power supply terminal;

A fourth transistor, wherein a gate of the fourth transistor is electrically connected to the other of the source and the drain of the second transistor, and a source and a drain of the fourth transistor are disposed between and electrically connected to the fourth node and the first power supply terminal;

A sixth transistor, wherein a gate of the sixth transistor is electrically connected to the fourth node, and a source and a drain of the sixth transistor are disposed between and electrically connected to a third power supply terminal and a second node;

A seventh transistor, wherein a gate of the seventh transistor is electrically connected to the fourth node, and a source and a drain of the seventh transistor are disposed between and electrically connected to a fourth power supply terminal and the second node; an eighth transistor, wherein a gate of the eighth transistor is electrically connected to the scan wire, and a source and a drain of the eighth transistor are disposed between and electrically connected to the first node and a data wire;

A ninth transistor, wherein a gate of the ninth transistor is electrically connected to the second node, and one of a source and a drain of the ninth transistor is electrically connected to a sixth power supply terminal; and A tenth transistor, wherein a gate of the tenth transistor is electrically connected to a light-emitting control wire, a source and a drain of the tenth transistor are disposed between and electrically connected to the other of the source and drain of the ninth transistor and an anode of a corresponding one of the plurality of light-emitting devices, and a cathode of the corresponding one of the plurality of light-emitting devices is electrically connected to a fifth power supply terminal.

Alternatively, in some embodiments of the invention, the at least one of the plurality of pixel driving circuits further includes:

A fifth transistor, a gate of the fifth transistor is electrically connected to the second power supply terminal, and a source and a drain of the fifth transistor are disposed between and electrically connected to the second power supply terminal and the third node; and A first capacitor disposed between and connected in series between the first node and the fifth power supply terminal.

A pixel driving circuit and a display panel are provided. The pixel driving circuit includes a data writing module, a data conversion module, and a current driving module. The data writing module is electrically connected to a first node and configured to transmit a data signal to the first node. The data conversion module is electrically connected to the first node, a second node, and a modulation signal source, and configured to generate a current driving control signal in response to a voltage difference between a modulation signal generated by the modulation signal source and the data signal received from the first node, and to output the current driving control signal to the second node. The current driving module is electrically connected to the second node, a light-emitting control wire, and a light-emitting device, and configured to control the light-emitting device to emit light according to the current driving control signal and a light-emitting control signal transmitted through the light-emitting control wire. An effective pulse of the current driving control signal has different pulse widths in different gray-scale states, to change a light-emitting during of the light-emitting device in the different gray-scale states, so as to realize gray-scale difference when images are displayed on the display panel, thereby improving deterioration of the color reproducibility of an image. The display panel includes a pixel driving circuit.

BRIEF DESCRIPTION OF THE DRAWINGS

In order for more clearly describing technical solutions in embodiments of the present disclosure, brief description will be given below with reference to the accompanying drawings which are illustrated for describing the embodiments. The accompanying drawings in the following description merely illustrate some embodiments of the present disclosure. For those skilled in the art, other drawings may be obtained from these drawings without creative effort.

DESCRIPTION OF SPECIFIC EMBODIMENTS OF THE INVENTION

Figure 1A:
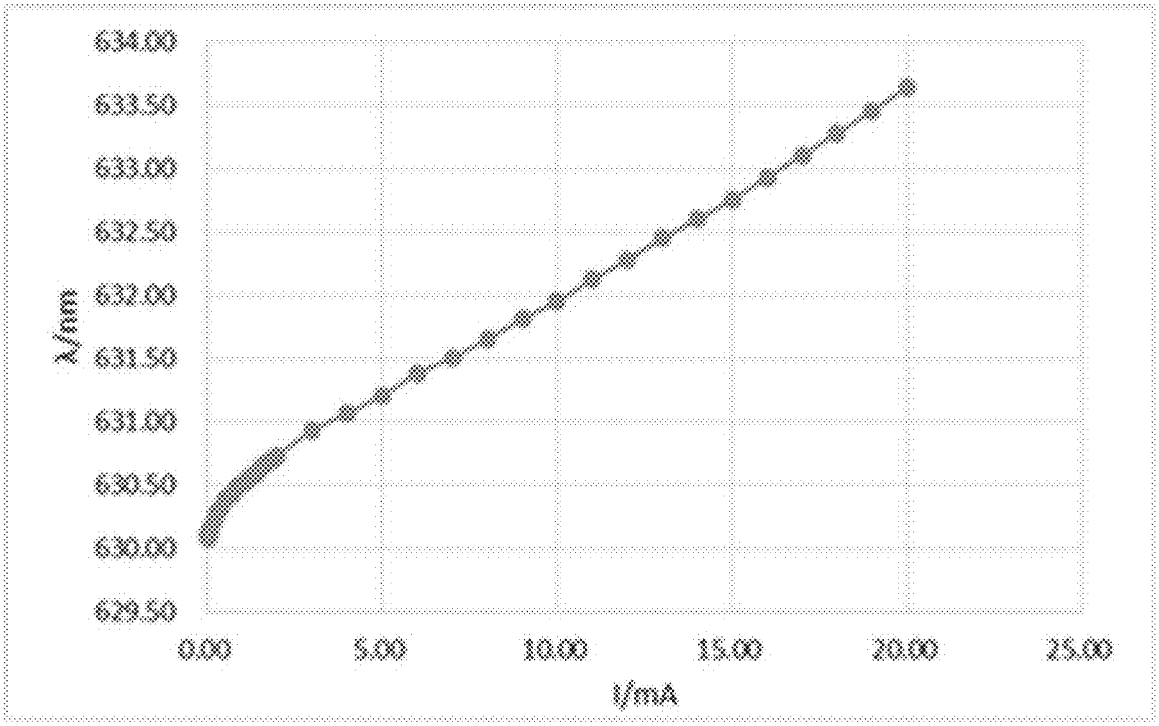
FIG. 1A is a graph of a light-emitting center wavelength of a light-emitting device with respect to current.

Technical solutions in embodiments of the present disclosure will be clearly and completely described with reference to the accompanying drawings in the embodiments of the present disclosure. It will be apparent that the described embodiments are only part of the embodiments of the present disclosure, and not all of the embodiments. Based on the presented embodiments in the present disclosure, all other embodiments obtained by a person skilled in the art without involving any inventive effort are within the scope of the present disclosure. Furthermore, it should be understood that the specific embodiments described herein are merely illustrative and explanatory of the present disclosure and are not intended to limit the present disclosure. In the present disclosure, unless described to the contrary, the use of positional terms such as “upper” and “down” usually refer to the up and down in the device in actual use or operation state, specifically, the drawing direction in the drawings; The “inside” and “outside” is provided with respect to the outline of the device.

Specifically, FIG. 1A is a graph of a light-emitting center wavelength of a light-emitting device with respect to current. The light-emitting device emitting light of red color is described as an example. As shown FIG. 1A, when applied with different driving currents I, the light-emitting center wavelength λ of the light-emitting device may be shifted, which causes the defect that color reproducibility of an image represented on a display screen is decreased (that is, color deviation).

Figure 1B:
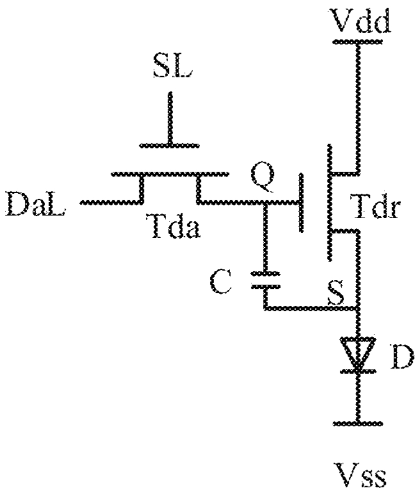
FIG. 1B (prior art)
FIG. 1B is a structural schematic view of a pixel driving circuit in the related art.

FIG. 1B is a structural schematic view of a pixel driving circuit in the related art. The pixel driving circuit in the related art includes a driving transistor Tdr, a data transistor Tda, and a capacitor C. A voltage value of a data signal Data transmitted through the data wire DaL may be changed, and thus a gate-source voltage difference Vgs of the driving transistor Tdr may be changed. Therefore, a magnitude of a driving current may be changed, and luminance of the light-emitting device may be changed, so that image represented on the display screen has a gray-scale difference.

Figure 2A:
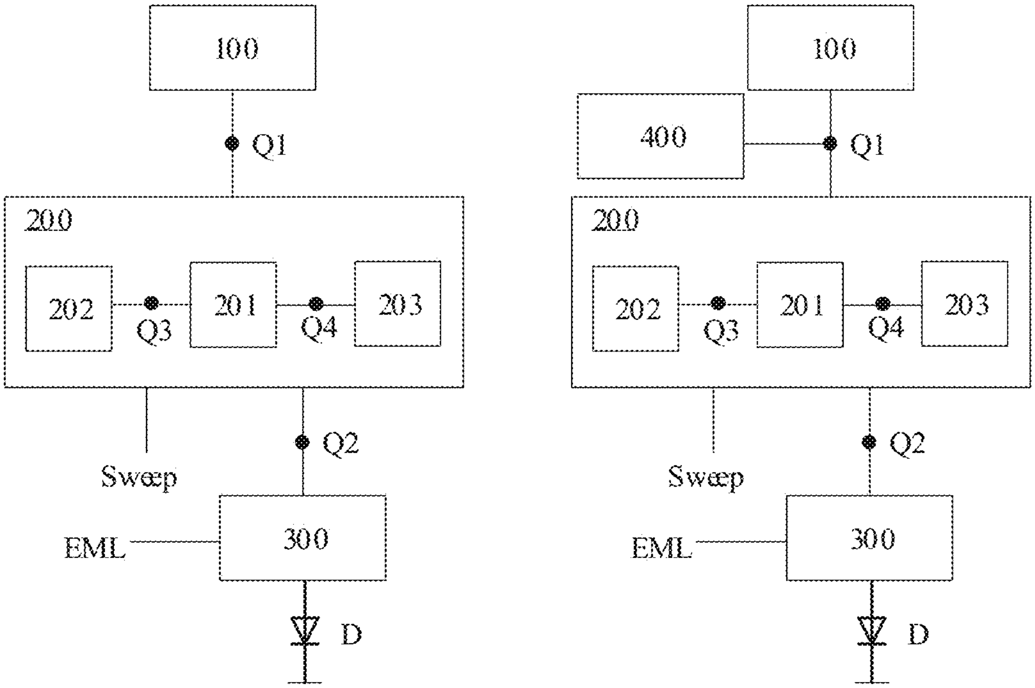
FIG. 2A to FIG. 2C are structural schematic views of a pixel driving circuit according to an embodiment of the present disclosure.
Figure 2B:
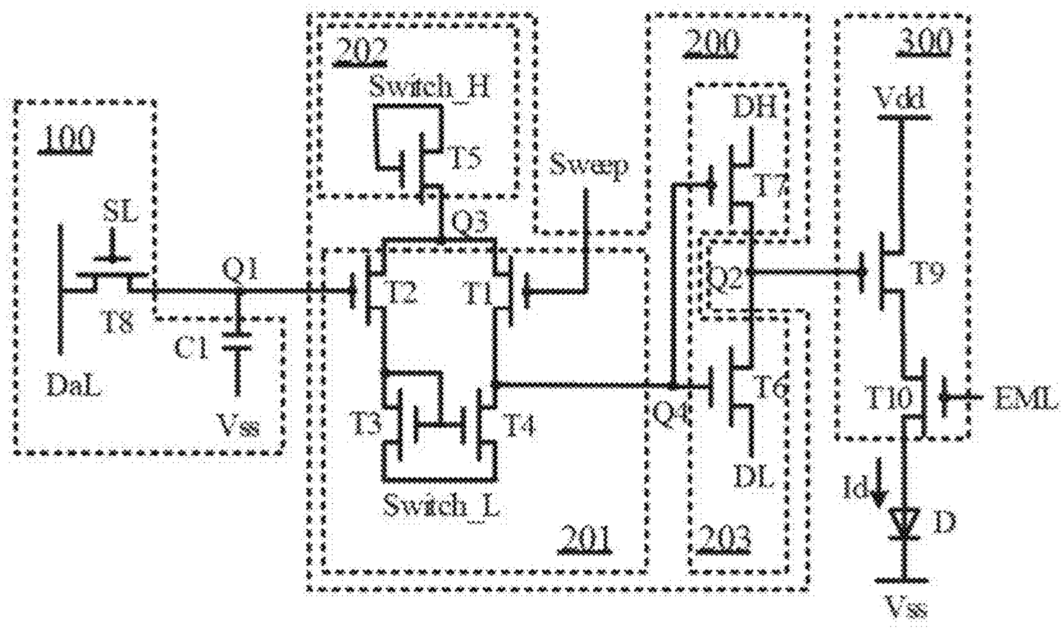
Figure 2C:
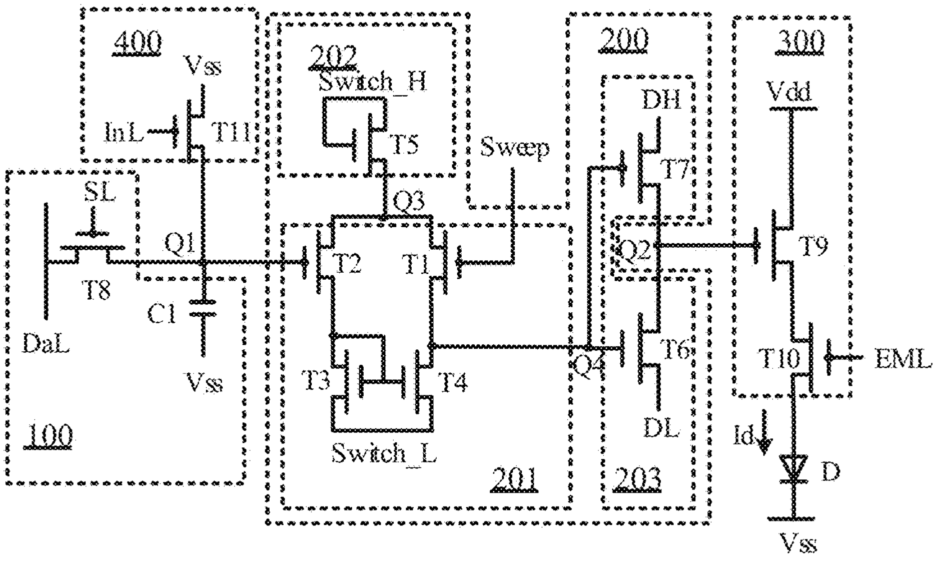

FIGS. 2A-2C are structural schematic views of a pixel driving circuit according to an embodiment of the present disclosure. In an embodiment of the present disclosure, a pixel driving circuit is provided. The pixel driving circuit includes a data writing module 100, a data conversion module 200, and a current driving module 300.

The data writing module 100 is electrically connected to a first node Q1, for transmitting a data signal Data to the first node Q1.

Alternatively, the data write module 100 may include an eighth transistor T8. A gate of the eighth transistor T8 is electrically connected to a scan wire SL. A source and a drain of the eighth transistor T8 are disposed between and electrically connected to the first node Q1 and the data wire DaL. The eighth transistor T8 is configured to transmit the data signal Data transmitted through the data wire DaL to the first node in response to a scan signal Scan(n) transmitted through a scan wire SL.

Alternatively, the eighth transistor T8 may be a P-type transistor or an N-type transistor. The eighth transistor T8 may be a silicon transistor or an oxide transistor.

Alternatively, the data writing module 100 may further include a first capacitor C1. The first capacitor C1 may be disposed between and connected in series with the first node Q1 and the fifth power supply terminal Vss, and be configured to maintain a potential of the first node Q1.

The data conversion module 200 may be electrically connected with the first node Q1, a second node Q2, and a modulation signal source Sweep, and may be configured to generate a current driving control signal Ic in response to a voltage difference between a modulation signal Sw generated by the modulation signal source Sweep and the data signal Data received from the first node Q1, and to output the current driving control signal Ic to the second node Q2.

Alternatively, the data conversion module 200 may include a current mirror unit 201. The current mirror unit 201 may be electrically connected with a third node Q3, the first node Q1, the modulation signal source Sweep, and a fourth node Q4, and may be configured to output a pulse width modulation signal in response to the voltage difference between the modulation signal Sw and the data signal Data, and to output the pulse width modulation signal to the fourth node Q4.

Alternatively, the current mirror unit 201 may include a first transistor T1, a second transistor T2, a third transistor T3, and a fourth transistor T4.

A gate of the first transistor T1 may be electrically connected to the modulation signal source Sweep. A source and a drain of the first transistor T1 may be electrically connected to the third node Q3 and the fourth node Q4.

A gate of the second transistor T2 may be electrically connected to the first node Q1. One of a source and a drain of the second transistor T2 may be electrically connected to the third node Q3.

A gate of the third transistor T3 may be electrically connected to the other of the source and the drain of the second transistor T2. A source and a drain of the third transistor T3 may be electrically connected to the other of the source and the drain of the second transistor T2 and a first power supply terminal Switch_L.

A gate of the fourth transistor T4 may be electrically connected to the other of the source and the drain of the second transistor T2. A source and a drain of the fourth transistor T4 may be electrically connected to the fourth node Q4 and the first power supply terminal Switch_L.

Alternatively, the third node Q3 may be connected to a constant power supply. Alternatively, the data conversion module 200 may further include a current source unit 202 electrically connected to the third node Q3.

Alternatively, the current source unit 202 may include a fifth transistor T5. A gate of the fifth transistor T5 may be electrically connected to a second power supply terminal Switch_H. A source and a drain of the fifth transistor T5 are disposed between and electrically connected to the second power supply terminal Switch_H and the third node Q3. The fifth transistor T5 may be configured to transmit a second power supply signal transmitted by the second power supply terminal Switch_H to the third node Q3.

Alternatively, the first transistor T1, the second transistor T2, the third transistor T3, the fourth transistor T4, or the fifth transistor T5 may be the P-type transistor or the N-type transistor. The first transistor T1, the second transistor T2, the third transistor T3, the fourth transistor T4, or the fifth transistor T5 may be the silicon transistor or the oxide transistor.

Alternatively, the data conversion module 200 may further include a signal correction unit 203. The signal correction unit 203 may be electrically connected to the fourth node Q4 and the second node Q2, and may be configured to generate the current driving control signal Ic in response to the pulse width modulation signal, and to transmit the current driving control signal Ic to the second node Q2.

An effective pulse of the current driving control signal Ic has different pulse widths in different gray-scale states, so that the light-emitting device D may emit light of different luminance, thereby realizing differences in the displayed gray-scale.

Alternatively, the pulse width of the effective pulse the current driving control signal Ic is positively correlated with a value of a gray level (or the gray-scale value). Alternatively, in a high gray-scale state, the current driving control signal Ic may have a plurality of first effective pulses. In a low gray-scale state, the current driving control signal Ic may have a plurality of second effective pulses. A pulse width of the first effective pulse is greater than a pulse width of the second effective pulse, and a magnitude of the first effective pulse is equal to a magnitude of the second effective pulse, so that a light-emitting duration of the light-emitting device D in the high-gray-scale state is longer than a light-emitting duration of the light-emitting device D in the low-gray-scale state.

Alternatively, the signal correction unit 203 may include a sixth transistor T6 and a seventh transistor T7.

A gate of the sixth transistor T6 may be electrically connected to the fourth node Q4. A source and a drain of the sixth transistor T6 may be electrically connected to a third power supply terminal DL and the second node Q2. The sixth transistor T6 is configured to transmit a third power supply signal transmitted by the third power supply terminal DL to the second node Q2 in response to the pulse width modulation signal.

A gate of the seventh transistor T7 may be electrically connected to the fourth node Q4. A source and a drain of the seventh transistor T7 may be electrically connected to a fourth power supply terminal DH and the second node Q2. The seventh transistor T7 is configured to transmit a fourth power supply signal transmitted by the fourth power supply terminal DH to the second node Q2 in response to the pulse width modulation signal.

Since the sixth transistor T6 and the seventh transistor T7 may respectively transmit the third power supply signal transmitted by the third power supply terminal DL and the fourth power supply signal transmitted by the fourth power supply terminal DH to the second node Q2 in response to the pulse width modulation signal, and may be configured to form the current driving control signal Ic. Therefore, the pulse width of the effective pulse of the current driving control signal Ic can be controlled more accurately.

Alternatively, the sixth transistor T6 or the seventh transistor T7 may be the P-type transistor or the N-type transistor. The sixth transistor T6 and the seventh transistor T7 may be the silicon transistor or the oxide transistor. To avoid that the sixth transistor T6 and the seventh transistor T7 are turned on at the same time, the sixth transistor T6 is one of the P-type transistor or the N-type transistor, and the seventh transistor T7 is the other of the P-type transistor or the N-type transistor.

Referring still to FIGS. 2A-2C, the current driving module 300 is electrically connected to the second node Q2, a light-emitting control wire EML, and the light-emitting device D, so that the light-emitting device D may emit light in response to the current driving control signal Ic and a light-emitting control signal Em(n) transmitted through the light-emitting control wire EML.

Alternatively, the current driving module 300 may include a ninth transistor T9 and a tenth transistor T10.

A gate of the ninth transistor T9 may be electrically connected to the second node Q2, and one of a source and a drain of the ninth transistor T9 may be electrically connected to a sixth power supply terminal Vdd.

A gate of the tenth transistor T10 may be electrically connected to the light-emitting control wire EML. A source and a drain of the tenth transistor T10 may be electrically connected to the other of the source and the drain of the ninth transistor T9 and an anode of the light-emitting device. A cathode of the light-emitting device D may be electrically connected to a fifth power supply terminal Vss.

A driving current Id for driving the light-emitting device D to emit light may be generated in a path from the sixth power supply terminal Vdd to the fifth power supply terminal Vss through the ninth transistor T9 and the tenth transistor T10, in response to the current driving control signal Ic and the light-emitting control signal Em(n).

Further, since the source and the drain of the tenth transistor T10 are disposed between and electrically connected to the ninth transistor T9 and the light-emitting device D, the tenth transistor T10 can avoid a display abnormality caused by misemission of the light-emitting device D when the data signal Data is transmitted to the pixel driving circuit, while controlling to turn on or off the current path from the sixth power supply terminal Vdd to the fifth power supply terminal Vss.

Alternatively, with reference to FIG. 2C again, the pixel driving circuit may further include a reset module 400 for resetting the first node Q1.

Alternatively, the reset module 400 may include an eleventh transistor T11. a gate of the eleventh transistor T11 may be electrically connected to a reset control wire InL. A source and a drain of the eleventh transistor T11 may be electrically connected to the first node Q1 and the fifth power supply terminal Vss.

Alternatively, the eighth transistor T8, the ninth transistor T9, the tenth transistor T10, or the eleventh transistor T11 may be the P-type transistor or the N-type transistor. The eighth transistor T8, the ninth transistor T9, the tenth transistor T10, or the eleventh transistor T11 may be the silicon transistor or the oxide transistor.

Alternatively, the first power supply signal, the second power supply signal, the third power supply signal, the fourth power supply signal, the fifth power supply signal, and the sixth power supply signal may be all DC signals. A voltage value of the second power supply signal transmitted by the second power supply terminal Switch_H may be greater than a voltage value of the first power supply signal transmitted by the first power supply terminal Switch_L. A voltage value of the fourth power supply signal transmitted by the fourth power supply terminal DH may be greater than a voltage value of the third power supply signal transmitted by the third power supply terminal DL. A voltage value of the sixth power supply signal transmitted by the sixth power supply terminal Vdd may be greater than a voltage value of the fifth power supply signal transmitted by the fifth power supply terminal Vss. Therefore, the pixel driving circuit can normally operate.

Alternatively, the modulation signal Sw may be a triangular wave signal. Accordingly, the voltage value of the data signal Data may be greater than that of the modulation signal Sw, the voltage value of the data signal Data may be equal to that of the modulation signal Sw, or the voltage value of the data signal Data may be less than that of the modulation signal Sw, as the modulation signal Sw varies with respect to time. That is, the voltage value of the data signal Data may be greater than a minimum voltage value of the modulation signal Sw, and less than a maximum voltage value of the modulation signal Sw. A branch current flowing through the first transistor T1, the fourth transistor T4, and a branch current flowing through the second transistor T2, the third transistor T3 are determined by the modulation signal Sw and the potential of the first node Q1, respectively. Thus, under the condition that both the first transistor T1 and the second transistor T2 are the P-type transistors, when the potential of the first node Q1 is higher than the modulation signal Sw, the branch current flowing through the first transistor T1 and the fourth transistor T4 may be larger than the branch current flowing through the second transistor T2 and the third transistor T3. Further, a resistance of a branch circuit in which the first transistor T1 and the fourth transistor T4 is disposed, and a resistance of a branch circuit in which the second transistor T2 and the third transistor T3 is disposed, and the first power supply signal transmitted by the first power supply terminal Switch_L are unchanged. Therefore, under the condition that the branch current flowing through the first transistor T1 and the fourth transistor T4 is increased, a voltage drop across the source and drain of the fourth transistor T4 is increased, so that the potential of the fourth node Q4 rises. In addition, the sixth transistor T6 is turned on as the potential of the fourth node Q4 rises, and the third power supply signal transmitted by the third power supply terminal DL is transmitted to the second node Q2. Conversely, when the potential of the first node Q1 is lower than the modulation signal Sw, the branch current flowing through the first transistor T1 and the fourth transistor T4 may be smaller than the branch current flowing through the second transistor T2 and the third transistor T3. Further, the resistance of the branch circuit in which the first transistor T1 and the fourth transistor T4 is disposed, and the resistance of the branch circuit in which the second transistor T2 and the third transistor T3 is disposed, and the first power supply signal transmitted by the first power supply terminal Switch_L are unchanged. Therefore, under the condition that the branch current flowing through the first transistor T1 and the fourth transistor T4 is decreased, the voltage drop across the source and drain of the fourth transistor T4 is decreased, so that the potential of the fourth node Q4 falls. In addition, the seventh transistor T7 is turned on as the potential of the fourth node Q4 falls, and the fourth power supply signal transmitted by the fourth power supply terminal DH is transmitted to the second node Q2.

It will be appreciated that under the condition that both the first transistor T1 and the second transistor T2 are the N-type transistors, when the potential of the first node Q1 is lower than the modulation signal Sw, the branch current flowing through the first transistor T1 and the fourth transistor T4 may be larger than the branch current flowing through the second transistor T2 and the third transistor T3, so that the potential of the fourth node Q4 rises. In addition, the sixth transistor T6 is turned on as the potential of the fourth node Q4 rises, and the third power supply signal transmitted by the third power supply terminal DL is transmitted to the second node Q2. When the potential of the first node Q1 is higher than the modulation signal Sw, the branch current flowing through the first transistor T1 and the fourth transistor T4 may be smaller than the branch current flowing through the second transistor T2 and the third transistor T3, so that the potential of the fourth node Q4 falls. In addition, the seventh transistor T7 is turned on as the potential of the fourth node Q4 falls, and the fourth power supply signal transmitted by the fourth power supply terminal DH is transmitted to the second node Q2.

Figure 3:
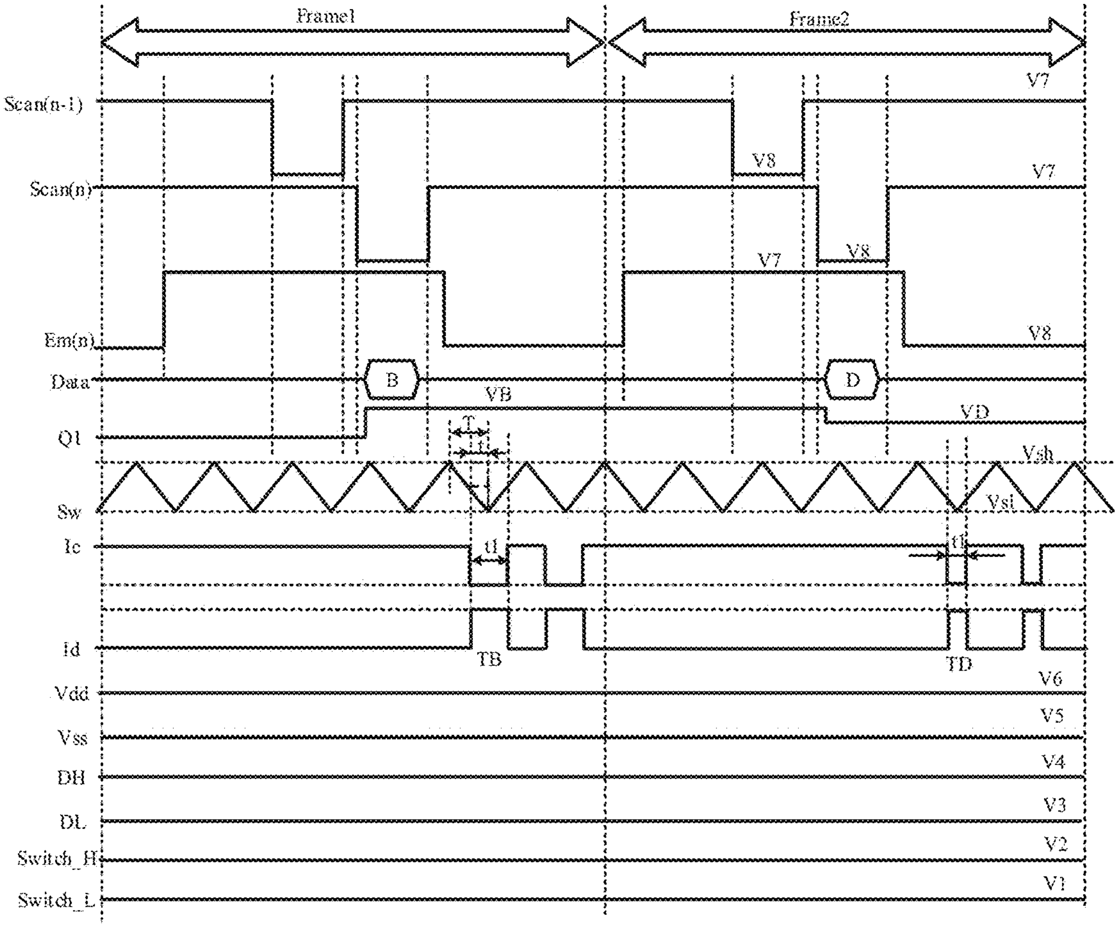
FIG. 3 is a driving timing diagram according to an embodiment of the present disclosure.

FIG. 3 is a driving timing diagram according to an embodiment of the present disclosure. Operation principle of the pixel driving circuit shown in FIG. 2B is described by taking the first transistor T1, the second transistor T2, the seventh transistor T7, the eighth transistor T8, the ninth transistor T9, and the tenth transistor T10 as the P-type transistors, and the third transistor T3, the fourth transistor T4, the fifth transistor T5, and the sixth transistor T6 as the N-type transistors as an example. V1-V6 represents the voltage values of the first power supply signal to the sixth power supply signal, respectively. V7 represents a high potential and V8 denotes a low potential. TB and TD both represent pulse widths. Vsh represents a maximum value of the modulation signal Sw. Vs1 represents a minimum value of the modulation signal Sw.

In a first frame Frame1, under the condition that the scan signal Scan(n) transmitted through the scan wire SL has a low potential, and the light-emitting control signal Em(n) transmitted through the light-emitting control wire EML has a high potential, the eighth transistor T8 is turned on, and the data signal Data transmitted through the data wire DaL is transmitted to the first node Q1. At this time, the data signal Data has a first voltage value VB.

After the scan signal Scan(n) changes from the low potential to a high potential, and the light-emitting control signal Em(n) changes from the high potential to a low potential, the tenth transistor T10 is turned on. Under the condition that the potential of the first node Q1 is higher than the modulation signal Sw, the branch current flowing through the first transistor T1 and the fourth transistor T4 may be larger than the branch current flowing through the second transistor T2 and the third transistor T3. Further, a resistance of a branch circuit in which the first transistor T1 and the fourth transistor T4 is disposed, and a resistance of a branch circuit in which the second transistor T2 and the third transistor T3 is disposed, and the first power supply signal transmitted by the first power supply terminal Switch_L are unchanged. Therefore, under the condition that the branch current flowing through the first transistor T1 and the fourth transistor T4 is increased, the voltage drop across the source and drain of the fourth transistor T4 is increased, so that the potential of the fourth node Q4 rises. In addition, the sixth transistor T6 is turned on as the potential of the fourth node Q4 rises, and the third power supply signal transmitted by the third power supply terminal DL is transmitted to the second node Q2 (i.e., corresponding to an effective pulse of the current driving control signal Ic). The ninth transistor T9 is turned on, and the light-emitting device D is switched to a light-emitting state. Under the condition that the potential of the first node Q1 is lower than the modulation signal Sw, the branch current flowing through the first transistor T1 and the fourth transistor T4 may be smaller than the branch current flowing through the second transistor T2 and the third transistor T3. Further, the resistance of the branch circuit in which the first transistor T1 and the fourth transistor T4 is disposed, and the resistance of the branch circuit in which the second transistor T2 and the third transistor T3 is disposed, and the first power supply signal transmitted by the first power supply terminal Switch_L are unchanged. Therefore, under the condition that the branch current flowing through the first transistor T1 and the fourth transistor T4 is decreased, the voltage drop across the source and drain of the fourth transistor T4 is decreased, so that the potential of the fourth node Q4 falls. In addition, the seventh transistor T7 is turned on as the potential of the fourth node Q4 falls, and the fourth power supply signal transmitted by the fourth power supply terminal DH is transmitted to the second node Q2 (i.e., corresponding to an ineffective pulse of the current driving control signal Ic between two effective pulses). The ninth transistor T9 is turned off, and the light-emitting device D is switched to a non-light-emitting state. The light-emitting device D is periodically switched between the light-emitting state and non-light-emitting state in response to the difference between the modulation signal Sw and the potential of the first node Q1, until the light-emitting control signal EM(n) changes from the low potential to the high potential.

In a second frame Frame2, under the condition that the scan signal Scan(n) transmitted through the scan wire SL has a low potential, and the light-emitting control signal Em(n) transmitted through the light-emitting control wire EML has a high potential, the eighth transistor T8 is turned on, and the data signal Data transmitted through the data wire DaL is transmitted to the first node Q1. At this time, the data signal Data has a second voltage value VD different from the first voltage value VB.

After the scan signal Scan(n) changes from the low potential to the high potential, and the light-emitting control signal Em(n) changes from the high potential to the low potential, the tenth transistor T10 is turned on. Under the condition that the potential of the first node Q1 is higher than the modulation signal Sw, the branch current flowing through the first transistor T1 and the fourth transistor T4 may be larger than the branch current flowing through the second transistor T2 and the third transistor T3, so that the potential of the fourth node Q4 rises. In addition, the sixth transistor T6 is turned on as the potential of the fourth node Q4 rises, and the third power supply signal transmitted by the third power supply terminal DL is transmitted to the second node Q2. The ninth transistor T9 is turned on, and the light-emitting device D is switched to a light-emitting state. Under the condition that the potential of the first node Q1 is lower than the modulation signal Sw, the branch current flowing through the first transistor T1 and the fourth transistor T4 may be smaller than the branch current flowing through the second transistor T2 and the third transistor T3, so that the potential of the fourth node Q4 falls. In addition, the seventh transistor T7 is turned on as the potential of the fourth node Q4 falls, and the fourth power supply signal transmitted by the fourth power supply terminal DH is transmitted to the second node Q2. The ninth transistor T9 is turned off, and the light-emitting device D is switched to a non-light-emitting state. The light-emitting device D is periodically switched between the light-emitting state and non-light-emitting state in response to the difference between the modulation signal Sw and the potential of the first node Q1, until the light-emitting control signal EM(n) changes from the low potential to the high potential.

By controlling the voltage value of the data signal Data transmitted through the data wire DaL in different frames, the effective pulses of the current driving control signal Ic may have different pulse widths in different frames in response to the voltage difference between the data signal Data and the modulation signal. Therefore, the effective pulses of the driving current Id may also have different pulse widths in different frames, the light-emitting device D may have different light-emitting durations in different gray-scale states, e, thereby realizing differences in the display gray-scale. The luminance of the light-emitting device D is proportional to the product of the light-emitting duration and the driving current Id.

Further, the light-emitting device D is periodically switched between the light-emitting state and non-light-emitting state in response to the difference between the modulation signal Sw and the potential of the first node Q1 during an active phase of the light-emitting control signal Em(n). Therefore, a luminance attenuation defect occurring when the light-emitting device D continuously emits light for a long time period can be improved, and a flicker problem can also be improved. The active phase of the light-emitting control signal Em(n) refers to a phase during which the tenth transistor T10 may be turned on.

It will be appreciated that the frequency and amplitude of the modulation signal Sw may be set as actually required.

To enable normal operation of the eighth transistor T8, the voltage value of the data signal Data may be greater than a voltage value corresponding to the low potential V8 of the scan signal Scan(n) and less than a voltage value corresponding to the high potential V7 of the scan signal Scan(n).

To ensure that the ninth transistor T9 may be effectively turned off, a difference between the voltage value of the fourth power supply signal V4 transmitted by the fourth power supply terminal DH and a threshold voltage of the ninth transistor T9 may be greater than or equal to the voltage value of the second power supply signal V2 transmitted by the second power supply terminal Vdd.

To enable normal operation of the tenth transistor T10, the voltage value corresponding to the high potential V7 of the light-emitting control signal Em(n) may be greater than the voltage value of the second power supply signal V2 transmitted by the second power supply terminal Vdd, and the voltage value corresponding to the low potential V8 of the light-emitting control signal Em(n) may be less than the voltage value of the first power supply signal V1 transmitted by the first power supply terminal Vss.

Alternatively, during the first time period t1, a voltage value of the modulation signal Sw may be less than the voltage value of the data signal Data. The pulse width of the effective pulse of the current driving control signal Ic may be equal to the first time period t1.

It will be appreciated that the first time period t1 may be calculated from Vsh, Vs1, and Data. Specifically, Taking the data signal Data as VB as an example, $t=t1/2=(VB-Vs1)\times T/(Vsh-Vs1)$.

Alternatively, the gray-scale state in the first frame Frame1 is the high gray-scale state and the gray-scale state in the second frame Frame2 is the low gray-scale state. The current driving control signal Ic has the plurality of first effective pulses in the first frame Frame1 and the plurality of second effective pulses in the second frame Frame2. The pulse width of the first effective pulse is TB, and the pulse width of the second effective pulse is TD, wherein TB>TD. The amplitude of the first effective pulse is equal to the amplitude of the second effective pulse, so that the light-emitting duration of the light-emitting device D in the high-gray-scale state is longer than the light-emitting duration of the light-emitting device D in the low-gray-scale state.

Alternatively, the first transistor T1 and the second transistor T2 are both the N-type transistors, and the voltage value of the modulation signal Sw is greater than the voltage value of the data signal Data for a second time period. The pulse width of the effective pulse of the current driving control signal Ic is equal to the second time period.

Alternatively, the reset module 400 may reset the first node Q1 before the data signal Data is transmitted to the first node Q1. That is, the eleventh transistor T11 is turned on in response to the reset control signal transmitted through the reset control wire InL, before the scan signal Scan(n) is switched to the active phase, thereby achieving reset of the first node Q1. The expression "the scan signal Scan(n) enters an active phase" means that a phase during which the eighth transistor T8 may be turned on.

In addition, a dummy frame may be further provided before the first frame Frame1, to reset the first node Q1. That is, before the first frame Frame1, the eighth transistor T8 is turned on in response to the scan signal Scan(n). At this time, the data signal Data has a voltage value for resetting the first node Q1.

A display panel including any one of the pixel driving circuits as described above may be further provided in an embodiment of the present disclosure.

Figure 4:
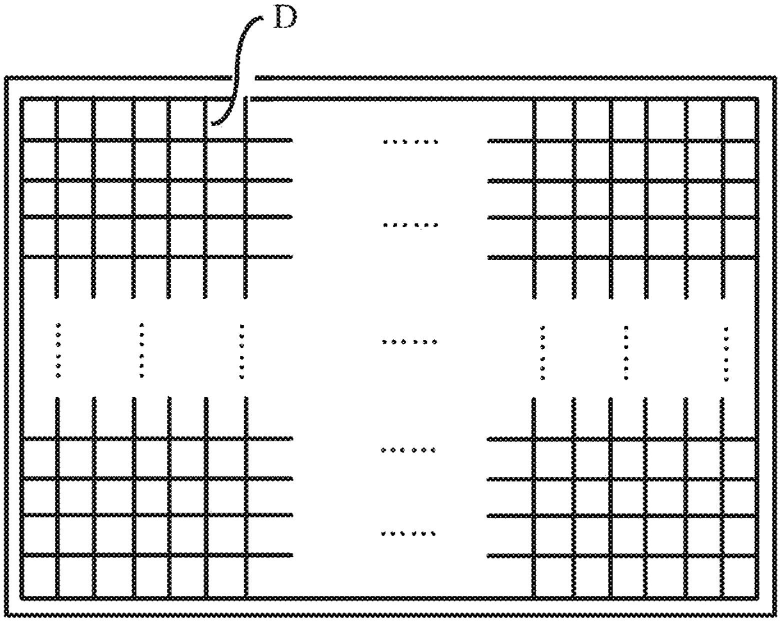
FIG. 4 is a structural schematic view of a display panel according to an embodiment of the present disclosure.
Figure 5A:
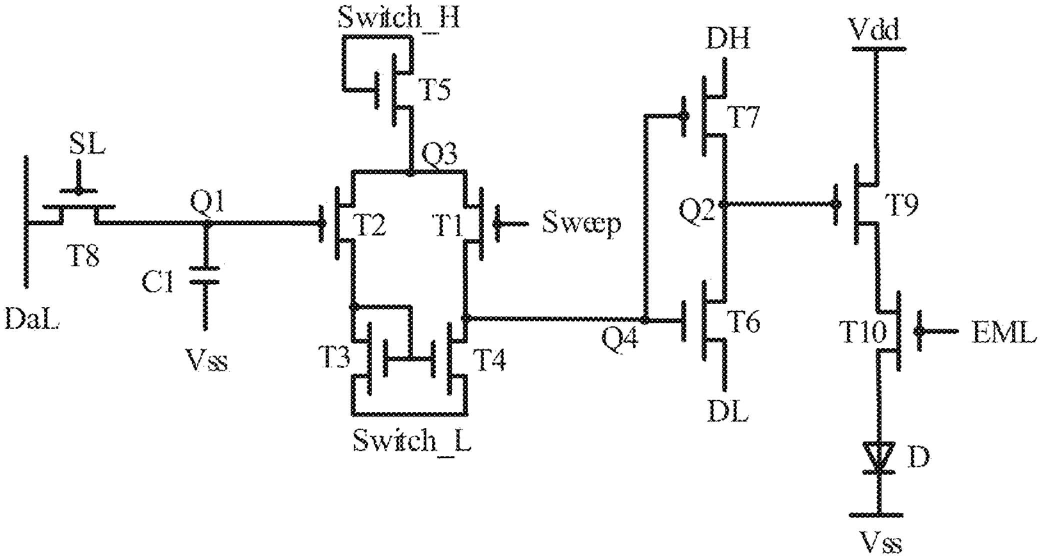
FIGS. 5A-5B are structural schematic views of a pixel driving circuit according to an embodiment of the present disclosure.
Figure 5B:
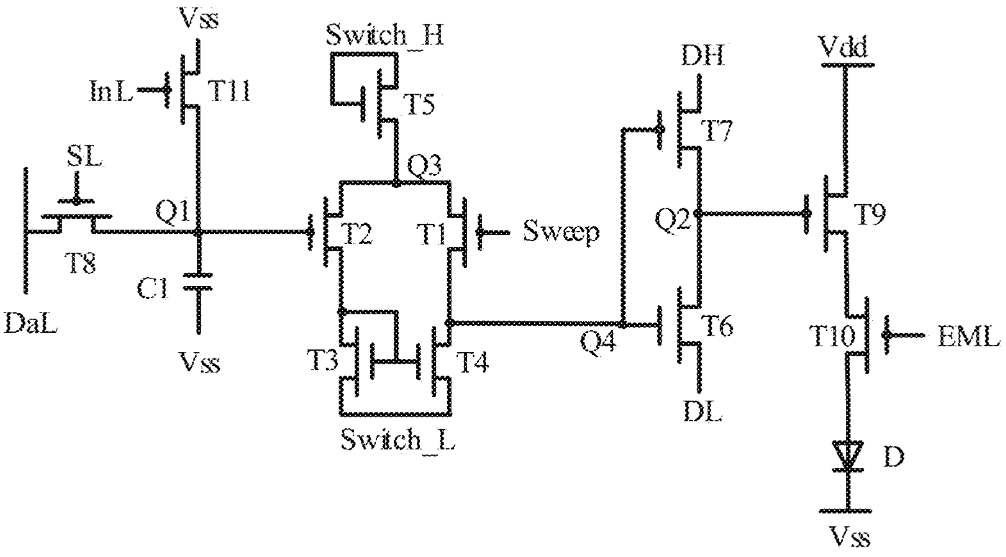

FIG. 4 is a structural schematic view of a display panel according to an embodiment of the present disclosure. FIGS. 5A-5B are structural schematic views of a pixel driving circuit according to an embodiment of the present disclosure.

In an embodiment of the disclosure, a display panel including a plurality of pixel driving circuits and a plurality of light-emitting devices D is further provided. The plurality of pixel driving circuits are electrically connected to the plurality of light-emitting devices. At least one of the pixel driving circuits includes:

A first transistor T1, wherein a gate of the first transistor T1 is electrically connected to a modulation signal source Sweep, and a source and a drain of the first transistor T1 are disposed between and electrically connected to a third node Q3 and a fourth node Q4;

A second transistor T2, wherein a gate of the second transistor T2 is electrically connected to a first node Q1, and one of a source and a drain of the second transistor T2 is electrically connected to the third node Q3;

A third transistor T3, wherein a gate of the third transistor T3 is electrically connected to the other of the source and the drain of the second transistor T2, and a source and a drain of the third transistor T3 are disposed between and electrically connected to the other of the source and the drain of the second transistor T2 and a first power supply terminal Switch_L;

A fourth transistor T4, wherein a gate of the fourth transistor T4 is electrically connected to the other of the source and the drain of the second transistor T2, and a source and a drain of the fourth transistor T4 are disposed between and electrically connected to the fourth node Q4 and the first power supply terminal Switch_L;

A sixth transistor T6, wherein a gate of the sixth transistor T6 is electrically connected to the fourth node Q4, and a source and a drain of the sixth transistor T6 are disposed between and electrically connected to a third power supply terminal DL and a second node Q2;

A seventh transistor T7, wherein a gate of the seventh transistor T7 is electrically connected to the fourth node Q4, and a source and a drain of the seventh transistor T7 are disposed between and electrically connected to a fourth power supply terminal DH and the second node Q2;

An eighth transistor T8, wherein a gate of the eighth transistor T8 is electrically connected to a scan wire, and a source and a drain of the eighth transistor T8 are disposed between the first node Q1 and a data wire DaL and electrically connected to the first node Q1 and the data wire DaL;

A ninth transistor T9, wherein a gate of the ninth transistor T9 is electrically connected to the second node Q2, and one of a source and a drain of the ninth transistor T9 is electrically connected to a sixth power supply terminal Vdd; and A tenth transistor T10, wherein a gate of the tenth transistor T10 is electrically connected to a light-emitting control wire EML, a source and a drain of the tenth transistor T10 are disposed between and electrically connected to the other of the source and the drain of the ninth transistor T9 and an anode of a corresponding one of the light-emitting devices D. A cathode of the light-emitting device is electrically connected to a fifth power supply terminal Vss.

Alternatively, at least one of the pixel driving circuits may further include a fifth transistor T5. A gate of the fifth transistor T5 is electrically connected to the first power supply terminal Switch_H. A source and a drain of the fifth transistor T5 are disposed between and electrically connected to the first power supply terminal Switch_H and the third node Q3.

Alternatively, at least one of the pixel driving circuits may further include a first capacitor C1 disposed between the first node Q1 and the fifth power supply terminal Vss and connected in series with the first node Q1 and the fifth power supply terminal Vss.

Alternatively, the plurality of the light-emitting devices D may include a first light-emitting device, a second light-emitting device, and a third light-emitting device emitting light of different colors. The plurality of the pixel driving circuits may include a first pixel driving circuit, a second pixel driving circuit, and a third pixel driving circuit. The first pixel driving circuit is configured to drive the first light-emitting device to emit light. The second pixel driving circuit is configured to drive the second light-emitting device to emit light. The third pixel driving circuit is configured to drive the third light-emitting device to emit light. Since the data signals transmitted through the data wires DaL respectively electrically connected to the first pixel driving circuit, the second pixel driving circuit, and the third pixel driving circuit may be different from each other, the light-emitting durations of the first light-emitting device, the second light-emitting device, and the third light-emitting device in a same gray-scale state may be different from each other, so that the gray-scale difference can be obtained and deterioration of the color reproducibility of an image can be improved.

Alternatively, the light-emitting device D may include a sub-millimeter light-emitting diode, a micro light-emitting diode, and an organic light-emitting diode.

A display device including any one of the driving circuits as described above or any one of the display panels as described above may be further provided in an embodiment of the present disclosure.

It will be appreciated that the display device may include a movable display device (such as a notebook computer, a mobile phone, or the like), a fixed terminal (such as a desktop computer, a television, or the like), a measuring device (such as a sports wristband, a thermometer, or the like), or the like.

Specific examples are provided to illustrate principles and implementations of the present disclosure. The description of the above embodiments is merely provided to help understand methods and the core idea of the present disclosure. At the same time, variations will occur to those skilled in the art in both the detailed description and the scope of the present disclosure in accordance with the teachings of the present disclosure. In summary, the present description should not be construed as limiting the present disclosure.

What is claimed is:

1. A pixel driving circuit, comprising:

a data writing module electrically connected to a first node and configured to transmit a data signal to the first node;

a data conversion module electrically connected to the first node, a second node, and a modulation signal source, and configured to generate a current driving control signal, and to output the current driving control signal to the second node; and a current driving module electrically connected to the second node, a light emitting control wire, and a light-emitting device, and configured to control the light-emitting device to emit light, wherein an effective pulse of the current driving control signal has different pulse widths in different gray-scale states, and a modulation signal generated by the modulation signal source includes a triangular wave signal, and wherein the data conversion module comprises:

a current source unit electrically connected to a third node;

a current mirror unit electrically connected to the third node, the first node, the modulation signal source, and a fourth node, and configured to generate a pulse width modulation signal, and to output the pulse width modulation signal to the fourth node;

a signal correction unit electrically connected to the fourth node and the second node, and configured to generate the current driving control signal and to transmit the current driving control signal to the second node.

2. The pixel driving circuit according to claim 1, wherein a voltage value of the data signal is greater than a minimum voltage value of the modulation signal, and less than a maximum voltage value of the modulation signal.

3. The pixel driving circuit according to claim 2, wherein a voltage value of the modulation signal is less than the voltage value of the data signal during a first time period, and wherein the pulse width is equal to a duration of the first time period.

4. The pixel driving circuit according to claim 1, wherein the current driving control signal has a plurality of first effective pulses in a high gray-scale state, and the current driving control signal has a plurality of second effective pulses in a low gray-scale state, and wherein the pulse width of each of the plurality of first effective pulses is greater than the pulse width of each of the plurality of second effective pulses, and an amplitude of each of the plurality of first effective pulses is equal to an amplitude of each of the plurality of second effective pulses.

5. The pixel driving circuit according to claim 1, wherein the current mirror unit comprises:

a first transistor, wherein a gate of the first transistor is electrically connected to the modulation signal source and a source and a drain of the first transistor are disposed between and electrically connected to the third node and the fourth node;

a second transistor, wherein a gate of the second transistor is electrically connected to the first node, and one of a source and a drain of the second transistor is electrically connected to the third node;

a third transistor, wherein a gate of the third transistor is electrically connected to the other of the source and the drain of the second transistor, and a source and a drain of the third transistor are disposed between and electrically connected to the other of the source and the drain of the second transistor and a first power supply terminal; and a fourth transistor, wherein a gate of the fourth transistor is electrically connected to the other of the source and the drain of the second transistor, and a source and a drain of the fourth transistor are disposed between and electrically connected to the fourth node and the first power supply terminal.

6. The pixel driving circuit according to claim 5, wherein the current source unit comprises a fifth transistor, a gate of the fifth transistor is electrically connected to a second power supply terminal, and a source and a drain of the fifth transistor are disposed between and electrically connected to the second power supply terminal and the third node, wherein the signal correction unit comprises a sixth transistor and a seventh transistor, a gate of the sixth transistor and a gate of the seventh transistor are both electrically connected to the fourth node, a source and a drain of the sixth transistor are disposed between and electrically connected to a third power supply terminal and the second node, and a source and a drain of the seventh transistor are disposed between and electrically connected to a fourth power supply terminal and the second node, and wherein a voltage value of a second power supply signal transmitted through the second power supply terminal is greater than a voltage value of a first power supply signal transmitted through the first power supply terminal, and a voltage value of a fourth power supply signal transmitted through the fourth power supply terminal is greater than a voltage value of a third power supply signal transmitted through the third power supply terminal.

7. The pixel driving circuit according to claim 1, wherein the data writing module comprises:

an eighth transistor, wherein a gate of the eighth transistor is electrically connected to a scan wire, and a source and a drain of the eighth transistor are disposed between and electrically connected to the first node and a data wire; and a first capacitor disposed between and connected in series with the first node and a fifth power supply terminal.

8. The pixel driving circuit according to claim 1, wherein the current driving module comprises:

a ninth transistor, wherein a gate of the ninth transistor is electrically connected to the second node, and one of a source and a drain of the ninth transistor is electrically connected to a sixth power supply terminal; and a tenth transistor, wherein a gate of the tenth transistor is electrically connected to the light-emitting control wire, and a source and a drain of the tenth transistor are disposed between and electrically connected to the other of the source and drain of the ninth transistor and an anode of the light-emitting device, wherein a cathode of the light-emitting device is electrically connected to a fifth power supply terminal, and a voltage value of a sixth power supply signal transmitted by the sixth power supply terminal is greater than a voltage value of a fifth power supply signal transmitted by the fifth power supply terminal.

9. The pixel driving circuit according to claim 1, further comprising a reset module, wherein the reset module comprises an eleventh transistor, and wherein a gate of the eleventh transistor is el electrically connected to a reset control wire, and a source and a drain of the eleventh transistor are disposed between and electrically connected to the first node and a fifth power supply terminal.

10. A display panel comprising a plurality of pixel driving circuits and a plurality of light-emitting devices, wherein the plurality of pixel driving circuits are electrically connected to the plurality of light-emitting devices, and at least one of the plurality of pixel driving circuits comprises:

a first transistor, wherein a gate of the first transistor is electrically connected to a modulation signal source and a source and a drain of the first transistor are disposed between and electrically connected to a third node and a fourth node;

a second transistor, wherein a gate of the second transistor is electrically connected to a first node, and one of a source and a drain of the second transistor is electrically connected to a second power supply terminal via the third node;

a third transistor, wherein a gate of the third transistor is electrically connected to the other of the source and the drain of the second transistor, and a source and a drain of the third transistor are disposed between and electrically connected to the other of the source and the drain of the second transistor and a first power supply terminal;

a fourth transistor, wherein a gate of the fourth transistor is electrically connected to the other of the source and the drain of the second transistor, and a source and a drain of the fourth transistor are disposed between and electrically connected to the fourth node and the first power supply terminal;

a sixth transistor, wherein a gate of the sixth transistor is electrically connected to the fourth node, and a source and a drain of the sixth transistor are disposed between and electrically connected to a third power supply terminal and a second node;

a seventh transistor, wherein a gate of the seventh transistor is electrically connected to the fourth node, and a source and a drain of the seventh transistor are disposed between and electrically connected to a fourth power supply terminal and the second node;

an eighth transistor, wherein a gate of the eighth transistor is electrically connected to the scan wire, and a source and a drain of the eighth transistor are disposed between and electrically connected to the first node and a data wire;

a ninth transistor, wherein a gate of the ninth transistor is electrically connected to the second node, and one of a source and a drain of the ninth transistor is electrically connected to a sixth power supply terminal; and a tenth transistor, wherein a gate of the tenth transistor is electrically connected to a light-emitting control wire, a source and a drain of the tenth transistor are disposed between and electrically connected to the other of the source and drain of the ninth transistor and an anode of a corresponding one of the plurality of light-emitting devices, and a cathode of the corresponding one of the plurality of light-emitting devices is electrically connected to a fifth power supply terminal, wherein an effective pulse of a current driving control signal output through the second node has different pulse widths in different gray-scale states.

11. The display panel according to claim 10, wherein the at least one of the plurality of pixel driving circuits further comprises:

a fifth transistor, a gate of the fifth transistor is electrically connected to the second power supply terminal, and a source and a drain of the fifth transistor are disposed between and electrically connected to the second power supply terminal and the third node; and a first capacitor disposed between and connected in series between the first node and the fifth power supply terminal.

12. The display panel according to claim 10, further comprising a reset module, wherein the reset module comprises an eleventh transistor, and wherein a gate of the eleventh transistor is electrically connected to a reset control wire, and a source and a drain of the eleventh transistor are disposed between and electrically connected to the first node and the fifth power supply terminal.

13. The display panel according to claim 10, wherein a modulation signal generated by the modulation signal source includes a triangular wave signal, and wherein a voltage value of a data signal transmitted through the data wire is greater than a minimum voltage value of the modulation signal, and less than a maximum voltage value of the modulation signal.

14. The display panel according to claim 13, wherein a voltage value of the modulation signal is less than the voltage value of the data signal during a first time period, and wherein the pulse width is equal to a duration of the first time period.

* * * * *